US011196628B1

(12) United States Patent
Shen et al.

(10) Patent No.: US 11,196,628 B1
(45) Date of Patent: Dec. 7, 2021

(54) MONITORING CONTAINER CLUSTERS

(71) Applicant: VMware, Inc., Palo Alto, CA (US)

(72) Inventors: Jianjun Shen, Redwood City, CA (US); Wenying Dong, Beijing (CN); Quan Tian, Beijing (CN); Antonin Bas, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/006,847

(22) Filed: Aug. 30, 2020

(30) Foreign Application Priority Data

Jul. 29, 2020 (WO) ................ PCT/CN2020/105523

(51) Int. Cl.
*H04L 12/24* (2006.01)
*H04L 12/935* (2013.01)

(52) U.S. Cl.
CPC ...... *H04L 41/0893* (2013.01); *H04L 49/3009* (2013.01)

(58) Field of Classification Search
CPC ..... H04L 41/00; H04L 41/08; H04L 41/0893; H04L 49/00; H04L 49/20; H04L 49/30; H04L 49/3009
See application file for complete search history.

(56) References Cited

U.S. PATENT DOCUMENTS

| | | | |
|---|---|---|---|
| 5,224,100 A | 6/1993 | Lee et al. | |
| 5,245,609 A | 9/1993 | Ofek et al. | |
| 5,265,092 A | 11/1993 | Soloway et al. | |
| 5,504,921 A | 4/1996 | Dev et al. | |
| 5,550,816 A | 8/1996 | Hardwick et al. | |
| 5,729,685 A | 3/1998 | Chatwani et al. | |
| 5,751,967 A | 5/1998 | Raab et al. | |
| 5,781,534 A | 7/1998 | Perlman et al. | |
| 6,104,699 A | 8/2000 | Holender et al. | |
| 6,104,700 A | 8/2000 | Haddock et al. | |
| 6,141,738 A | 10/2000 | Munter et al. | |
| 6,219,699 B1 | 4/2001 | McCloghrie et al. | |
| 6,430,160 B1 | 8/2002 | Smith et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,658,002 B1 | 12/2003 | Ross et al. | |

(Continued)

FOREIGN PATENT DOCUMENTS

| | | |
|---|---|---|
| EP | 1154601 A1 | 11/2001 |
| JP | 2002141905 A | 5/2002 |

(Continued)

OTHER PUBLICATIONS

Non-Published commonly Owned U.S. Appl. No. 17/006,845, filed Aug. 30, 2020, 70 pages, VMware, Inc.

(Continued)

*Primary Examiner* — Boris D Grijalva Lobos
(74) *Attorney, Agent, or Firm* — Adeli LLP

(57) ABSTRACT

Some embodiments provide a method that receives a request for flow entries associated with a particular Kubernetes concept. The method identifies flow entries that match the request. For each flow entry that matches the request, the method generates mapping data that maps elements of the flow entry to additional Kubernetes concepts. The method provides the flow entries with the mapping data in response to the request.

18 Claims, 12 Drawing Sheets

(56) References Cited

U.S. PATENT DOCUMENTS

| | | |
|---|---|---|
| 6,680,934 B1 | 1/2004 | Cain |
| 6,721,334 B1 | 4/2004 | Ketcham |
| 6,785,843 B1 | 8/2004 | McRae et al. |
| 6,941,487 B1 | 9/2005 | Balakrishnan et al. |
| 6,963,585 B1 | 11/2005 | Pennec et al. |
| 6,999,454 B1 | 2/2006 | Crump |
| 7,013,342 B2 | 3/2006 | Riddle |
| 7,062,559 B2 | 6/2006 | Yoshimura et al. |
| 7,079,544 B2 | 7/2006 | Wakayama et al. |
| 7,180,856 B1 | 2/2007 | Breslau et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,243,143 B1 | 7/2007 | Bullard |
| 7,283,473 B2 | 10/2007 | Arndt et al. |
| 7,315,985 B1 | 1/2008 | Gauvin et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,577,131 B2 | 8/2009 | Joseph et al. |
| 7,590,133 B2 | 9/2009 | Hatae et al. |
| 7,602,723 B2 | 10/2009 | Mandato et al. |
| 7,606,260 B2 | 10/2009 | Oguchi et al. |
| 7,627,692 B2 | 12/2009 | Pessi |
| 7,633,955 B1 | 12/2009 | Saraiya et al. |
| 7,639,625 B2 | 12/2009 | Kaminsky et al. |
| 7,643,488 B2 | 1/2010 | Khanna et al. |
| 7,649,851 B2 | 1/2010 | Takashige et al. |
| 7,706,266 B2 | 4/2010 | Plamondon |
| 7,710,874 B2 | 5/2010 | Balakrishnan et al. |
| 7,729,245 B1 | 6/2010 | Breslau et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,919 B2 | 10/2010 | Nadeau et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,937,492 B1 | 5/2011 | Kompella et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,024,478 B2 | 9/2011 | Patel |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,254,273 B2 | 8/2012 | Kaminsky et al. |
| 8,265,062 B2 | 9/2012 | Tang et al. |
| 8,265,075 B2 | 9/2012 | Pandey |
| 8,281,067 B2 | 10/2012 | Stolowitz |
| 8,290,137 B2 | 10/2012 | Yurchenko et al. |
| 8,306,043 B2 | 11/2012 | Breslau et al. |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,558 B2 | 1/2013 | Nicholson et al. |
| 8,351,418 B2 | 1/2013 | Zhao et al. |
| 8,359,576 B2 | 1/2013 | Prasad et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,645,952 B2 | 2/2014 | Biswas et al. |
| 8,750,288 B2 | 6/2014 | Nakil et al. |
| 8,762,501 B2 | 6/2014 | Kempf et al. |
| 8,806,005 B2 | 8/2014 | Miri et al. |
| 8,837,300 B2 | 9/2014 | Nedeltchev et al. |
| 8,838,743 B2 | 9/2014 | Lewites et al. |
| 8,929,221 B2 | 1/2015 | Breslau et al. |
| 9,059,926 B2 | 6/2015 | Akhter et al. |
| 9,197,529 B2 | 11/2015 | Ganichev et al. |
| 9,226,220 B2 | 12/2015 | Banks et al. |
| 9,258,195 B1 | 2/2016 | Pendleton et al. |
| 9,280,448 B2 | 3/2016 | Farrell et al. |
| 9,282,019 B2 | 3/2016 | Ganichev et al. |
| 9,344,349 B2 | 5/2016 | Ganichev et al. |
| 9,407,580 B2 | 8/2016 | Ganichev et al. |
| 9,602,334 B2 | 3/2017 | Benny |
| 9,860,151 B2 | 1/2018 | Ganichev et al. |
| 9,898,317 B2 | 2/2018 | Nakil et al. |
| 10,044,581 B1 | 8/2018 | Russell |
| 10,181,993 B2 | 1/2019 | Ganichev et al. |
| 10,200,306 B2 | 2/2019 | Nhu et al. |
| 10,469,342 B2 | 11/2019 | Lenglet et al. |
| 10,608,887 B2 | 3/2020 | Jain et al. |
| 10,778,557 B2 | 9/2020 | Ganichev et al. |
| 10,805,239 B2 | 10/2020 | Nhu et al. |
| 2001/0020266 A1 | 9/2001 | Kojima et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0218447 A1 | 9/2006 | Garcia et al. |
| 2006/0221961 A1 | 10/2006 | Basso et al. |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0097982 A1 | 5/2007 | Wen et al. |

(56) References Cited

U.S. PATENT DOCUMENTS

| | | |
|---|---|---|
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049614 A1 | 2/2008 | Briscoe et al. |
| 2008/0049621 A1 | 2/2008 | McGuire et al. |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0112551 A1 | 5/2008 | Forbes et al. |
| 2008/0159301 A1 | 7/2008 | Heer |
| 2008/0240095 A1 | 10/2008 | Basturk |
| 2009/0010254 A1 | 1/2009 | Shimada |
| 2009/0100298 A1 | 4/2009 | Lange et al. |
| 2009/0109973 A1 | 4/2009 | Ilnicki |
| 2009/0123903 A1 | 5/2009 | Weitenberner |
| 2009/0150527 A1 | 6/2009 | Tripathi et al. |
| 2009/0245138 A1 | 10/2009 | Sapsford et al. |
| 2009/0249213 A1 | 10/2009 | Murase et al. |
| 2009/0292858 A1 | 11/2009 | Lambeth et al. |
| 2009/0327903 A1 | 12/2009 | Smith et al. |
| 2010/0128623 A1 | 5/2010 | Dunn et al. |
| 2010/0131636 A1 | 5/2010 | Suri et al. |
| 2010/0188976 A1 | 7/2010 | Rahman et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0137602 A1 | 6/2011 | Desineni et al. |
| 2011/0194567 A1 | 8/2011 | Shen |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0079478 A1 | 3/2012 | Galles et al. |
| 2012/0159454 A1 | 6/2012 | Barham et al. |
| 2012/0182992 A1 | 7/2012 | Cowart et al. |
| 2012/0275331 A1 | 11/2012 | Benkö et al. |
| 2012/0287791 A1 | 11/2012 | Xi et al. |
| 2013/0024579 A1 | 1/2013 | Zhang et al. |
| 2013/0031233 A1 | 1/2013 | Feng et al. |
| 2013/0041934 A1 | 2/2013 | Annamalaisami et al. |
| 2013/0044636 A1 | 2/2013 | Koponen et al. |
| 2013/0054761 A1 | 2/2013 | Kempf et al. |
| 2013/0058346 A1 | 3/2013 | Sridharan et al. |
| 2013/0067067 A1 | 3/2013 | Miri et al. |
| 2013/0125120 A1 | 5/2013 | Zhang et al. |
| 2013/0163427 A1 | 6/2013 | Beliveau et al. |
| 2013/0163475 A1 | 6/2013 | Beliveau et al. |
| 2013/0332602 A1 | 12/2013 | Nakil et al. |
| 2013/0332983 A1 | 12/2013 | Koorevaar et al. |
| 2013/0339544 A1 | 12/2013 | Mithyantha |
| 2014/0019639 A1 | 1/2014 | Ueno |
| 2014/0029451 A1 | 1/2014 | Nguyen |
| 2014/0115578 A1 | 4/2014 | Cooper et al. |
| 2014/0119203 A1 | 5/2014 | Sundaram et al. |
| 2014/0126418 A1 | 5/2014 | Brendel et al. |
| 2014/0157405 A1 | 6/2014 | Joll et al. |
| 2014/0177633 A1 | 6/2014 | Manula et al. |
| 2014/0195666 A1 | 7/2014 | Dumitriu et al. |
| 2014/0207926 A1 | 7/2014 | Benny |
| 2014/0219086 A1 | 8/2014 | Cantu' et al. |
| 2014/0281030 A1 | 9/2014 | Cui et al. |
| 2014/0282823 A1 | 9/2014 | Rash et al. |
| 2014/0304393 A1 | 10/2014 | Annamalaisami et al. |
| 2015/0016286 A1 | 1/2015 | Ganichev et al. |
| 2015/0016287 A1 | 1/2015 | Ganichev et al. |
| 2015/0016298 A1 | 1/2015 | Ganichev et al. |
| 2015/0016469 A1 | 1/2015 | Ganichev et al. |
| 2015/0043378 A1 | 2/2015 | Bardgett et al. |
| 2015/0180755 A1 | 6/2015 | Zhang et al. |
| 2015/0263899 A1 | 9/2015 | Tubaltsev et al. |
| 2015/0281036 A1 | 10/2015 | Sun et al. |
| 2016/0105333 A1 | 4/2016 | Lenglet et al. |
| 2016/0119204 A1 | 4/2016 | Murasato et al. |
| 2016/0149791 A1 | 5/2016 | Ganichev et al. |
| 2016/0226741 A1 | 8/2016 | Ganichev et al. |
| 2017/0317954 A1 | 11/2017 | Masurekar et al. |
| 2017/0358111 A1 | 12/2017 | Madsen |
| 2018/0062939 A1 | 3/2018 | Kulkarni et al. |
| 2018/0102959 A1 | 4/2018 | Ganichev et al. |
| 2018/0123903 A1 | 5/2018 | Holla et al. |
| 2018/0262447 A1 | 9/2018 | Nhu et al. |
| 2018/0262594 A1 | 9/2018 | Nhu et al. |
| 2018/0373961 A1 | 12/2018 | Wang et al. |
| 2019/0109769 A1 | 4/2019 | Jain et al. |
| 2019/0140931 A1 | 5/2019 | Ganichev et al. |
| 2020/0067799 A1 | 2/2020 | Lenglet et al. |
| 2020/0106744 A1* | 4/2020 | Miriyala ............ H04L 41/0806 |
| 2021/0029059 A1 | 1/2021 | Nhu et al. |
| 2021/0051109 A1 | 2/2021 | Chitalia et al. |
| 2021/0218630 A1 | 7/2021 | Lu et al. |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 9506989 A1 | 3/1995 |
| WO | 2012126488 A1 | 9/2012 |
| WO | 2013184846 A1 | 12/2013 |
| WO | 2015005968 A1 | 1/2015 |

OTHER PUBLICATIONS

Non-Published commonly Owned Related U.S. Appl. No. 17/006,846 with similar specification, filed Aug. 30, 2020, 47 pages, VMware, Inc.

Non-Published commonly Owned U.S. Appl. No. 17/068,655, filed Oct. 12, 2020, 63 pages, Nicira, Inc.

Phaal, Peter, et al., "sFlow Version 5," Jul. 2004, 46 pages, available at http://www.sflow.org/sflow_version_5.txt.

Phan, Doantam, et al., "Visual Analysis of Network Flow Data with Timelines and Event Plots," VizSEC 2007, Month Unknown 2007, 16 pages.

* cited by examiner

```
kind: Network Policy
metadata:
   name: web-app-policy
   namespace: web-app
spec:
  podSelector:
    matchLabels:
      app: web-server
    policyTypes:
    - Ingress
    ingress:
    - from:
      - podSelector:
          matchLabels:
            app: web-client
      ports:
      - protocol: TCP
        port: 80
```

```
antctl get networkpolicy state web-app/web-app-policy web-app/web-app-policy:
  appliedTo: [{web-app/web-server-sp7z2} {web-app/web-
server-
wpgmq}]
  span: [k8s1 k8s2]
  rule1:
    source: [{web-app/web-client 172.100.0.3}]
    ports: [{TCP/80}]
```

*Figure 6*

*antctl get networkpolicy flows web-app/web-app-policy --node k8s2* web-app/web-app-policy:
  flows:

- raw: cookie=0x8501000094e9d817, table=90, priority=200, ip,nw_src=172.100.0.3 actions=conjunction (1,1/3)
    table: ingressRuleTable (NetworkPolicy ingress rules)
    networkPolicyConjunctionFlow (matching NetworkPolicy rule conditions):
      networkPolicy: web-app/web-app-policy
      rule: rule1
      matchingSource: {web-app/web-client 172.100.0.3}
      status: realized
                                                                              ↖ 705

- raw: cookie=0x850100004e9d817, table=90, priority=200, ip,reg1=0x4 actions=conjunction(1,2/3)
    table: ingressRuleTable (NetworkPolicy ingress rules)
    networkPolicyConjunctionFlow (matching NetworkPolicy rule conditions):
      networkPolicy: web-app/web-app-policy
      rule: rule1
      matchingAppliedToPod: web-app/web-server-sp7z2
      status: realized
                                                                              ↖ 710

- raw: cookie=0x8501000094e9d817, table=90, priority=200, tcp,tp_dst=80 actions=conjunction(1,3/3)
    table: ingressRuleTable (NetworkPolicy ingress rules)
    networkPolicyConjunctionFlow (matching NetworkPolicy rule conditions:
      networkPolicy: web-app/web-app-policy
      rule: rule1
      matchingPort: tcp/80
      status: realized
                                                                              ↖ 715

- raw: cookie=0x8501000094e9d817, table=90, priority=190, conj_id=1, ip actions=resubmit(,105)
    table: ingressRuleTable (NetworkPolicy ingress rules)
    networkPolicyPassFlow (passing traffic matched allow rule):
      networkPolicy: web-app/web-app-policy
      rule: rule1
      passedPackets: 8
      passedBytes: 592
      status: realized
                                                                              ↖ 720

```
tcp, orig = (src=192.168.86.78, dst=192.168.86.05, sport=51476, dport=6443,
bytes=110696), reply = (src=192.168.86.05, dst=192.168.86.78, sport=6443, dport=51476,
packets=1694, bytes=101266), timeout=61757, protoinfo=(state=ESTABLISHED)

tcp,orig = (src=100.10.10.1, dst=100.10.10.16, sport=54088, dport=8181, packets=5, bytes=387),
reply = (src=100.10.10.16, dst=100.10.10.1, sport=8181, dport=54088, packets=5, bytes=405),
timeout=113, protoinfo=(state=TIME_WAIT)
```

1200 → (top), 1205, 1210

MONITORING CONTAINER CLUSTERS

BACKGROUND

The use of containers has changed the way applications are packaged and deployed, with monolithic applications being replaced by microservice-based applications. Here, the application is broken down into multiple, loosely coupled services running in containers, with each service implementing a specific, well-defined part of the application. However, the use of containers also introduces new challenges, in that the fleet of containers need to be managed and all these services and containers need to communicate with each other.

Management of the containers is addressed by container orchestration systems, such as Docker Swarm, Apache Mesos, or Kubernetes, the latter of which has become a de-facto choice for container orchestration. Kubernetes clusters can be run in an on-premises datacenter or in any public cloud (e.g., as a managed service or by bringing-up your own cluster on compute instances). These Kubernetes clusters may include both Linux and Windows hosts, and thus to enable networking between the entities of a cluster it is important to have a single network plugin that can be easily run on any platform and any cloud. It is also highly desirable to be able to configure global security policies across these clusters and provide centralized visibility (e.g., with simple debugging and troubleshooting features).

BRIEF SUMMARY

Some embodiments provide debugging and troubleshooting techniques for a container network interface plugin (e.g., for a Kubernetes cluster). Specifically, some embodiments map networking and/or network policy data to cluster abstractions in order to present this networking and/or network policy data to users (e.g., network administrators, application developers, etc.). This networking and/or network policy data may include flow table entries, ongoing network connections, flow tracing information, etc.

Some embodiments provide this mapping data in the context of a container network interface plugin. In some embodiments, a container cluster (e.g., a Kubernetes cluster) includes numerous nodes (e.g., virtual machines (VMs), physical host servers), each of which executes one or more pods (e.g., lightweight VMs on which parts of an application execute). The container network interface (CNI) plugin of some embodiments includes a set of modules that execute on each node to provide networking and security functionality for the pods. Specifically, some embodiments operate a flow-based managed forwarding element (e.g., Open vSwitch) on each node, to which each of the pods connect. In addition, a CNI agent executes on each node (i) to configure the forwarding element and (ii) to handle troubleshooting requests. In addition, a CNI controller separate from the nodes provides configuration data (e.g., forwarding information, network policy to be enforced) to the agents, which use this configuration data to configure the forwarding elements on their respective nodes. Distributed services (e.g., for aggregating troubleshooting information from multiple nodes) may also execute within the cluster.

In this context, the agent of some embodiments on a particular container host (e.g., a Kubernetes node) is capable of identifying flow entries used by the managed forwarding element of the particular container host related to a particular container cluster concept (e.g., a Kubernetes abstraction, such as a pod or network policy) and mapping elements of these flow entries to different Kubernetes concepts (including those in the request). Flow entries in flow-based forwarding elements include, in some embodiments, (i) a set of match conditions against which data messages are compared and (ii) a set of actions for the forwarding element to perform on data messages that match the match conditions.

When an agent receives a request for flow entries that relate to a particular Kubernetes concept (e.g., to a specific network policy), the agent identifies flow entries realized by the forwarding element executing on its container host that match the request. For example, for specific network policies or network policy rules, flow entries include a specific identifier in one of the match or action fields (e.g., a conjunction identifier, for conjunctive flow entries). Specific pods can be identified by network addresses (or data link addresses) used in flow entries (e.g., as match conditions). For each identified flow entry that matches the request, the agent generates mapping data that maps elements of the flow entry to specific Kubernetes concepts (e.g., pods, network policies, rules, etc.). For instance, matches over table identifiers, network addresses, and other conditions may be indicative of specific network policies and/or network policy rules, pods, nodes, etc. Raw flow entry data may be difficult for a network administrator or application developer to understand, so the generated mapping data is provided along with each flow entry for presentation to the requesting user. In different embodiments, this data is provided to the controller or directly to a user interface (e.g., a command line interface) from which the request was received.

In some embodiments, either the agent or another module operating on each of the container hosts along with the agent (e.g., a connection exporter module), also monitors ongoing connections being processed by the forwarding element. This module retrieves data about these ongoing connections, maps the data to Kubernetes concepts implemented in the cluster, and exports the ongoing connection information along with the mapped Kubernetes concepts. The connection data typically includes at least source and destination network addresses and transport layer ports as well as transport layer protocol, and may also include information about the status of the ongoing connection (e.g., the number of packets sent in either direction, the amount of data sent, any related connections, etc.). In some embodiments, the module maps the source and destination addresses to specific Kubernetes concepts (e.g., pods executing on that container host or other container hosts, distributed services, etc.). In addition, in some embodiments, the module identifies network policies that are relevant to each ongoing connection and exports this information along with the other connection and mapping data.

In some embodiments, the forwarding element uses a separate connection tracker module to store state regarding ongoing connections (because the flow entries used by the forwarding element are otherwise stateless). This connection tracker module stores the connection information (e.g., source and destination network addresses, source and destination transport layer ports, protocol, amounts of packets and data transferred, connection state). In some embodiments, the connection tracker stores this information for both incoming and outgoing directions of a connection. For flow entries (e.g., network policy flow entries) that require connection state information, the forwarding element retrieves this connection state information from the connection tracker module.

The connection exporter module on a host container, in some embodiments, retrieves the ongoing connections from the connection tracker module (e.g., at regular intervals) and maps this data to the Kubernetes concepts as described above. In some embodiments, the connection exporter module exports the connection data to a connection aggregator executing in the Kubernetes cluster (e.g., as a distributed service). This connection data may be exported as, e.g., IPFIX data, with the mapping information stored as metadata (e.g., as IPFIX information elements). In addition, in some embodiments, the connection exporter module also maintains metrics tied to the Kubernetes concepts, such as the number of connections per pod, per pod namespace, or per node, the number of connections to which each different network policy is applied, or the number of connections that meet a specific TCP connection state (e.g., only having the TCP_SYN flag).

The connection aggregator receives connection data (with mapping data for the Kubernetes concepts) from the flow exporter modules on multiple nodes of the cluster. In some embodiments, the connection aggregator also adds additional mapping data for the Kubernetes cluster concepts (e.g., information that is not efficient for the connection exporter module to add). This connection aggregator may also compare and combine data for the same ongoing connections from source and destination nodes. In addition, either the connection aggregator or a separate network visualizer analyzes the aggregated connection data and uses this data to generate a cluster visualization. This cluster visualization may show pods, nodes, services, etc. of the cluster, as well as the connections between these entities.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 5 illustrates an example network policy of some embodiments for web servers in a cluster.

FIG. 6 illustrates an example of network policy state report of some embodiments retrieved from the CNI controller for the network policy of FIG. 5.

FIG. 7 illustrates a report of some embodiments showing flow entries annotated with Kubernetes cluster mapping data.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide debugging and troubleshooting techniques for a container network interface plugin (e.g., for a Kubernetes cluster). Specifically, some embodiments map networking and/or network policy data to cluster abstractions in order to present this networking and/or network policy data to users (e.g., network administrators, application developers, etc.). This networking and/or network policy data may include flow table entries, ongoing network connections, flow tracing information, etc.

Figure 1:
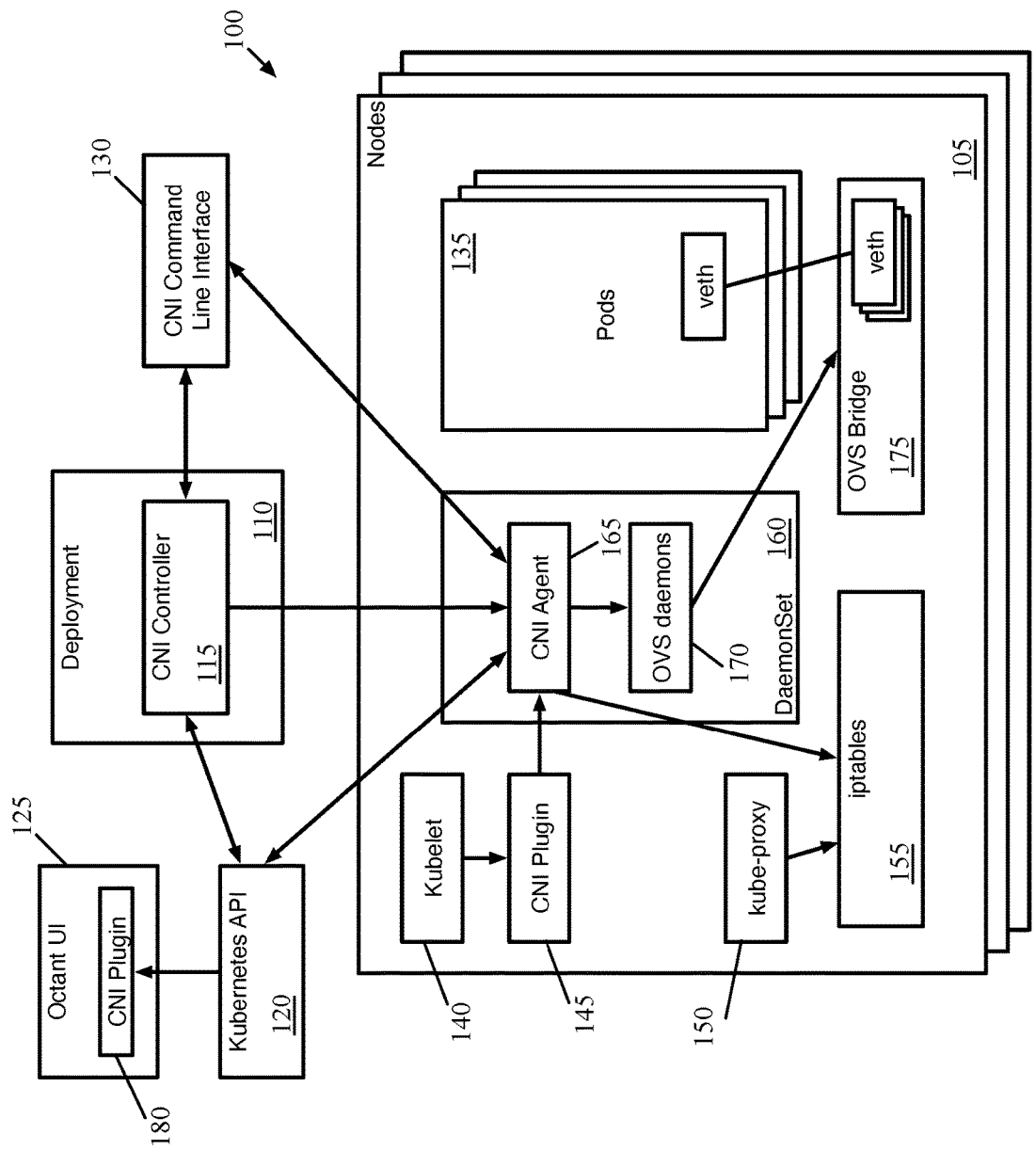
FIG. 1 conceptually illustrates a Kubernetes cluster with forwarding and networking managed by a container network interface (CNI) plugin of some embodiments.

Some embodiments provide this mapping data in the context of a container network interface plugin for a container cluster (e.g., a Kubernetes cluster). FIG. 1 conceptually illustrates a Kubernetes cluster 100 with forwarding and networking managed by a container network interface (CNI) plugin of some embodiments. As shown, the cluster 100 includes numerous nodes 105, as well as a deployment 110 on which a CNI controller 115 runs, a Kubernetes API 120, an Octant UI 125, and a CNI command line interface 130 (which may or may not actually be part of the cluster 100, in different embodiments).

In some embodiments, the nodes 105 are virtual machines or physical host servers that host pods 135, as well as various entities that enable the pods 135 to run on the node 105. As shown, these various entities include a kubelet 140, a CNI plugin 145, a kube-proxy 150, iptables 155, a daemonset 160 which includes a CNI agent 165 and one or more Open vSwitch (OVS) daemons 170, and an OVS bridge 175. The pods, in some embodiments, are lightweight virtual machines (VMs) or other data compute nodes (DCNs) that encapsulate one or more containers. Pods may wrap a single container or a number of related containers (e.g., containers for the same application) that share resources. In some embodiments, each pod 135 includes storage resources for the containers as well as a network address (e.g., an IP address) at which the pod can be reached.

The kubelet 140 is a standard Kubernetes agent that runs on each node in a cluster to manage containers running in the pods 135. Similarly, the kube-proxy 150 is a network proxy that runs on each node in a Kubernetes cluster to maintain network rules and manage the iptables 155 or another datapath implementation. In some embodiments, the iptables 155 are configured by the kube-proxy 150, but not actually used for networking as the OVS daemons 170 and OVS bridge 175 are instead used for handling networking between pods 135.

The kubelet 140 on each node 105 executes the CNI plugin 145 on that node, in some embodiments. In some embodiments, the CNI plugin 145 is a gRPC client that issues remote procedure calls to the CNI agent 165 on the node for each container network interface command, which returns the result of those commands (or an error) to CNI plugin 145.

The daemonset 160 is a type of pod that is instantiated on all of the nodes 105 of the cluster, in this case to execute the CNI agent 165 and the OVS daemons 170. The CNI agent 165 on a particular node is responsible for managing the OVS instantiation on the node (i.e., the OVS daemons 170 and the OVS bridge 175), the operation of which is described below. In some embodiments, the CNI agent 165 executes in a separate container of the daemonset 160 than the OVS daemons 170.

Whenever a new pod 135 is to be created on a node 105, the CNI agent 165 receives instructions from the CNI plugin 145 about the creation of the new pod. The CNI agent 165 creates the pod's network interface (e.g., a veth interface or other virtual ethernet device/adapter), allocates a network address (e.g., IP address) for the interface, and connects the interface to the OVS bridge 175 (e.g., via a corresponding network interface on the OVS bridge 175). The CNI agent 165 also generates and installs the necessary networking flow entries for this network address in one of the OVS daemons 170 (i.e., in ovs-vswitchd, the daemon responsible for processing data messages for which flow entries are not cached in the OVS bridge 175). Flow entries in flow-based forwarding elements such as OVS include, in some embodiments, (i) a set of match conditions against which data packets are compared and (ii) a set of actions for the forwarding element to perform on data packets that match the match conditions.

In some embodiments, the agent 165 also receives updates from the Kubernetes API server 120 regarding the creation of new nodes 105 (either by monitoring for updates at the Kubernetes API server 120, or by the server 120 pushing such updates to all of the agents 165), so that it can create a new tunnel to each remote node in the cluster in OVS (e.g., by creating new flow entries for tunneling to the remote node). In addition, the agent 165 receives updates from the CNI controller 115 when network policies are created, removed, or modified (again, either by monitoring for updates at the CNI controller 115, or by the controller 115 pushing such updates to all of the agents 165 that require the updates). The agent 165 generates and installs new flow entries in OVS to implement these network policies for the local pods 135. Furthermore, as described in greater detail below, the CNI agent 165 handles certain types of troubleshooting and/or monitoring requests (e.g., flow entry realization requests, flow tracing requests, etc.).

OVS, as mentioned, includes the OVS bridge 175 as well as OVS daemons 170. These daemons 170, in some embodiments, include ovsdb-server (for handling configuration of the OVS bridge via database tables) and ovs-vswitchd. The latter daemon, as mentioned, processes data messages for which the OVS bridge 175 does not have flow entries. The OVS bridge 175 on a particular node 105 includes a classifier that processes data messages (i) between two pods 135 on its node 105, (ii) between a pod 135 on its node 105 and another pod or service on a different node in the cluster, and (iii) between a pod 135 on its node 105 and an external address. The OVS bridge 175 stores cached flow entries for faster processing of these data messages without involving the OVS daemon ovs-vswitchd when possible.

However, when the OVS bridge 175 receives a data message for which it does not have a cached flow entry (e.g., the first data message of a connection), the bridge 175 passes the data message to the ovs-vswitchd daemon 170. This user space classifier daemon processes the data message through a set of staged flow tables (or subtables of a single flow table) that store flow entries, typically requiring multiple lookups over the course of several stages. The daemon uses these results to generate a cache flow entry for similar data messages (e.g., for the same connection and/or for similar connections) and provides this cache flow entry to the OVS bridge 175 so that the bridge can more efficiently process subsequent data messages for the same or similar connections.

The CNI agent 165 creates the OVS bridge 175 on its node, as well as the virtual ethernet device/adapter (e.g., veth pairs) for each pod 135. In addition, the CNI agent 165 creates an internal port on the OVS bridge 175 as the gateway for the node's pod subnet, as well as a tunnel port for creating overlay tunnels to other nodes (e.g., using VXLAN, Geneve, STT, etc.). In some embodiments, each node 105 in the cluster 100 is assigned a subnet for its pods, and all of the pods 135 are assigned a network address (i.e., by the CNI agent 165) in the subnet of their node 105 (referred to herein as a "pod subnet" or "node pod subnet"). The agent 165 also assigns the gateway port a network address in the node's pod subnet (e.g., the first IP address in a classless inter-domain routing (CIDR) block allocated for the node).

When one pod 135 sends a data message to a pod or service on another node, the OVS bridge 175 on the source node applies any network policies, performs forwarding (e.g., based on the destination network address of the data message), and encapsulates the data message to be sent to the appropriate node. The agent 165 is responsible for generating and installing flow entries in the OVS daemon 170 (ovs-vswitchd) that map destination network addresses (i.e., pod subnets of nodes) to the appropriate encapsulation tunnel addresses (which typically correspond to network addresses of node network interfaces (which are different from and outside of the pod subnets allocated for the nodes).

Outside of the nodes 105, the cluster 100 also includes a CNI controller 115, which in some embodiments is implemented as a Kubernetes deployment 110. The CNI controller 115 receives configuration changes (e.g., to network policy, pod, or namespace resources) from the Kubernetes API 120 (e.g., by monitoring the Kubernetes API 120). The controller 115 computes policy rules that can be translated to OVS flow entries and provides these policy rules to the agents 165 on the nodes 105. In some embodiments, the controller 115 identifies which nodes 105 host pods 135 to which each rule applies, and only disseminate the rules to the agents 165 on the appropriate nodes 105.

The controller 115 also exposes a REST API to enable the CNI command line interface (CLI) 130 to access the controller 115. The CLI 130, in some embodiments, queries information from (i) the controller 115 and (ii) the agents 165. A user (e.g., an administrator, application developer, etc.) can use CLI queries to retrieve basic runtime information from the controller 115 and/or agents 165. In addition, as described further below, the users may also request information about the flow entries realized on the nodes, request data about ongoing connections within the cluster, and/or initiate flow trace operations through the CLI 130.

Lastly, the Octant UI 125 is an existing user interface tool for developers to use to gain insight into how applications run on a Kubernetes cluster. The CNI plugin 180 for the Octant UI 125 enables a user to view the health and basic runtime information for the controller 115 and the agents 165 in the Octant UI 125. In some embodiments, the plugin 180 accesses the Kubernetes API 120 to retrieve this information via custom resource definitions (CRDs) in the API 120 that are created by the controller 115 and each agent 165 to populate their health and runtime information.

The CNI aspects of the cluster (i.e., the controller 115, Octant CNI plugin 180, CLI 130, plugins 145, agents 165, and OVS modules 170 and 175) can be deployed in some embodiments via a single YAML manifest in some embodiments. Just as Kubernetes supports multiple platforms (e.g., Linux and Windows) for the nodes, the CNI plugin of some embodiments can also be adapted to support multiple platforms. Specifically, for Windows nodes, some embodiments directly connect containers to the physical network through an external Hyper-V switch. In this configuration, OVS operates as an extension of the Hyper-V switch that is bound to a host networking system (HNS) network. This allows the OVS bridge to process data messages sent to and from the containers on the pods. To maintain the host connectivity, the original network configuration on the physical NIC is moved to the OVS bridge in some such embodiments. In addition, in some such embodiments, both the agent 165 and the OVS daemons 170 are run as processes rather than as containers.

When using the CNI of some embodiments in the cloud, this CNI may operate in tandem with or as an alternative to a default CNI provided by the cloud provider. For instance, the CNI of some embodiments may operate in a policy-only mode, in which case the default cloud provider CNI is responsible for performing IP address management (IPAM) operations and allocating secondary IP addresses from virtual private cloud (VPC) subnets. The cloud provider CNI is already aware of the underlying VPC network and configuration. In this mode, the CNI of some embodiments does not perform any encapsulation, as all inter-node traffic is served by the VPC network. Instead, the CNI of this invention enforces Kubernetes network policies on the pods in the cluster. In addition, in some embodiments, the CNI implements its own policy specification using CRDs, thereby providing additional security features in the cloud.

In such a managed cloud, the pod network is known to the physical underlay network, and therefore (as mentioned) there is no need to perform encapsulation. In this mode, an additional bridge (referred to as a transport bridge, rather than the integration bridge shown in FIG. 1) of OVS is created on each node to allow unencapsulated access to the underlay network. The integration bridge 175 is connected to the transport bridge via a patch port, with the physical uplink attached to the transport bridge and its network address moved to the internal transport bridge interface. In this case, routing is performed using the routing tables in the host network stack. Service traffic from the gateway port uses a custom routing table, such that a packet is sent back to the integration bridge after DNAT is performed by the kube-proxy 150. In addition to these changes, some embodiments add additional flows to an ARP response table in order to respond to ARP requests.

Some embodiments allow the CNI configuration to be modified in such a way that multiple CNIs can be invoked, in a specified order, to perform various tasks involved in the life cycle of a network interface created for a container. In the cloud case here, the cloud provider CNI is invoked first to allocate an IP and MAC address from the VPC subnet. The cloud provider CNI then passes that information in the network configuration to the CNI of this invention. This CNI is then invoked with this network configuration, to create the required interface(s) for the container and program the necessary flows in OVS.

It should be understood that the cluster shown in FIG. 1 is only one example of a Kubernetes cluster in which the CNI of some embodiments may be deployed. For instance, some embodiments do not include a kube-proxy executing in the nodes and/or use a different datapath implementation rather than iptables. In addition, as shown below, other modules may also execute in the nodes.

In these contexts, the CNI agent of some embodiments on a particular node is capable of identifying flow entries used by the forwarding element of the particular node (i.e., the OVS instance on the node) related to a particular container cluster concept (e.g., a Kubernetes abstraction, such as a pod or network policy) requested by a user. The CNI agent maps elements of these flow entries to different Kubernetes concepts, including those in the request, and returns them to the requestor. In general, OVS provides useful tools that allow a user to view bridge configurations as well as raw flow entries. However, a typical Kubernetes application developer is not familiar with OVS flow entries (or the tools for viewing OVS data), which can make it more difficult for them to understand and troubleshoot the network. However, if the agent can correlate the Kubernetes abstractions (e.g., pods, services, nodes, network policies) to the internal state of the CNI (e.g., via the flow entries realized in the OVS instances), this allows such a user to identify whether the Kubernetes abstractions are properly realized.

Figure 2:
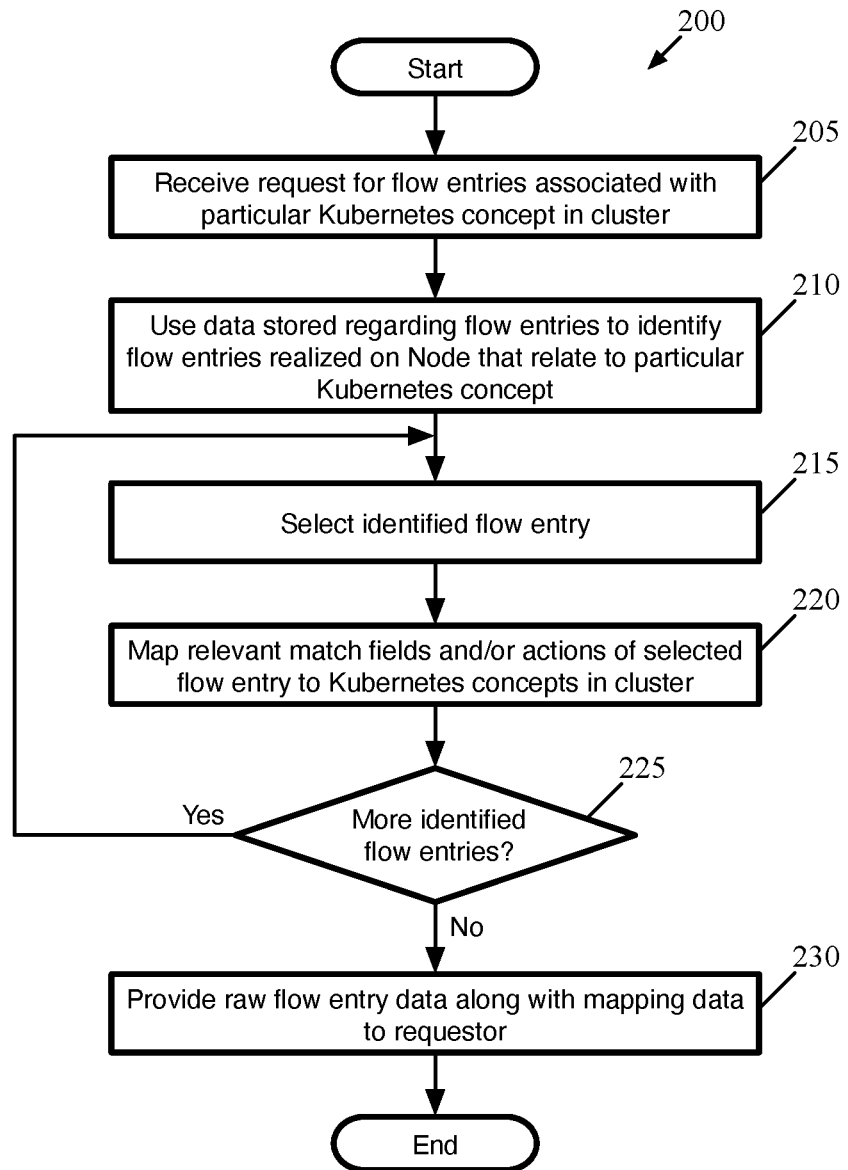
FIG. 2 conceptually illustrates a process of some embodiments for responding to a request for information about flow entries realized on a node that relate to a particular Kubernetes concept.
Figure 3:
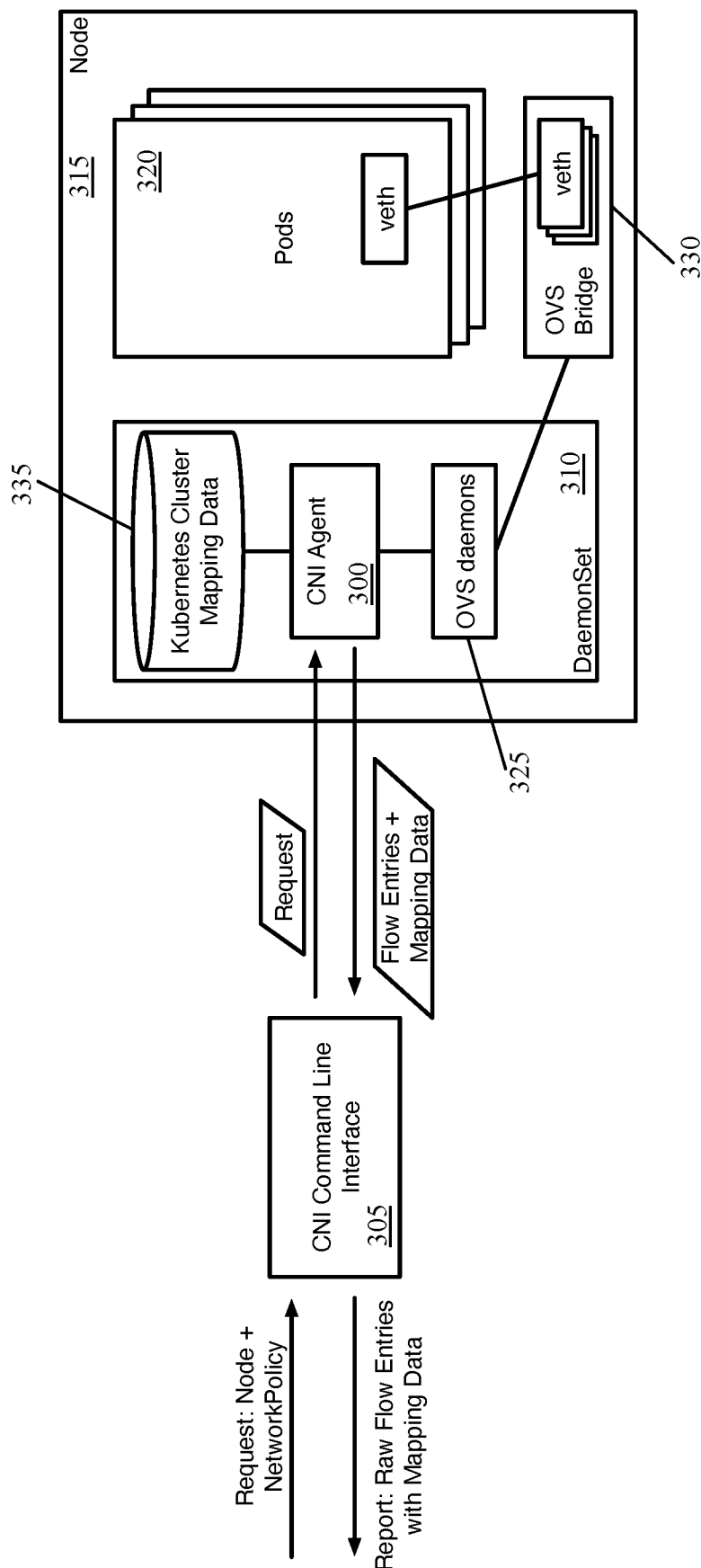
FIG. 3 conceptually illustrates an example in which a CNI agent receives and processes a request directly from a command line interface (CLI) tool of the CNI.
Figure 4:
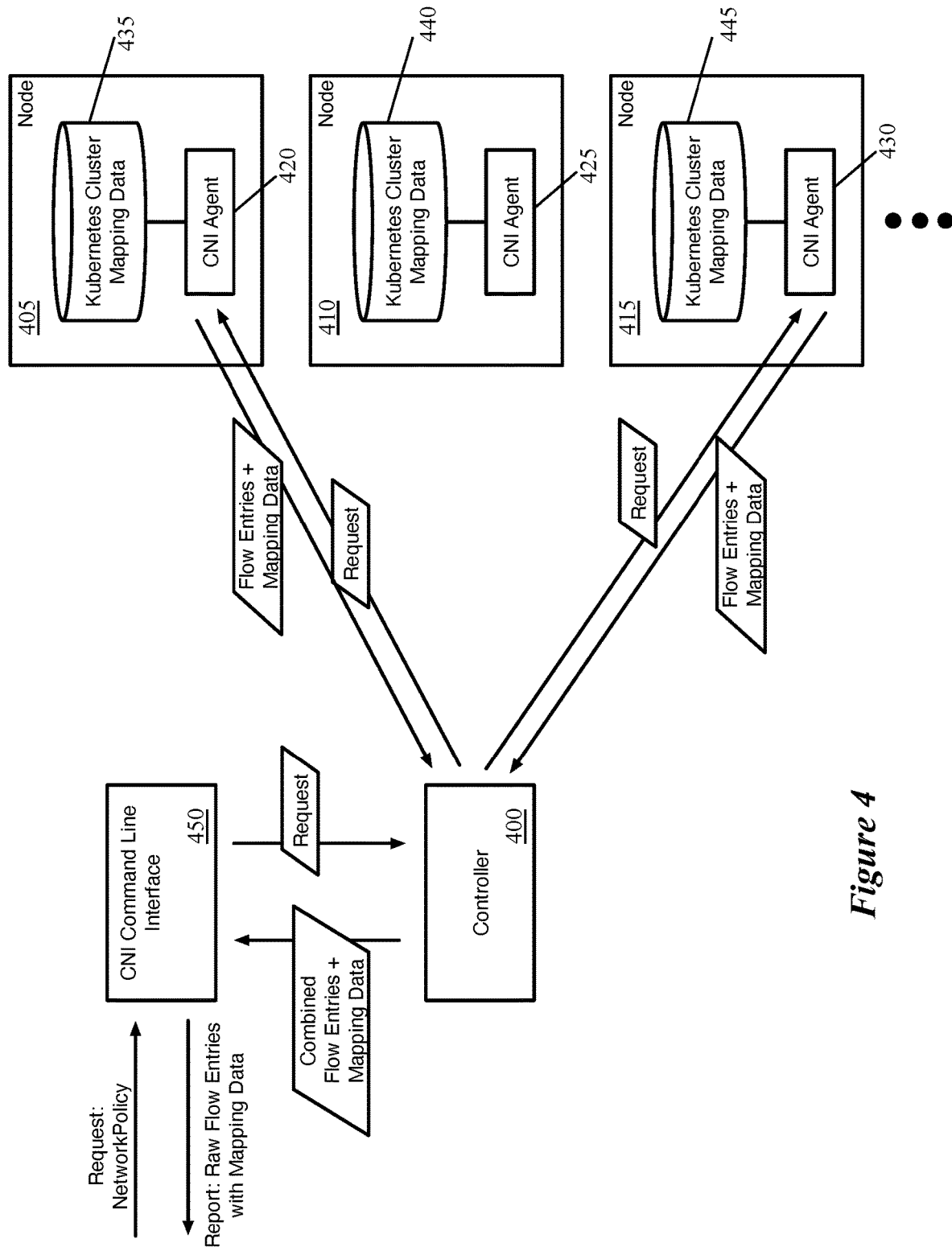
FIG. 4 conceptually illustrates an example in which a controller sends a request to CNI agents on multiple nodes in a cluster and aggregates the responses from these nodes.

FIG. 2 conceptually illustrates a process 200 of some embodiments for responding to a request for information about flow entries realized on a node that relate to a particular Kubernetes concept. The process 200 is performed, in some embodiments, by a CNI agent executing on a node (e.g., the agent 165 executing within a daemonset pod on a node). The process 200 will be described at least in part by reference to FIGS. 3-7. FIGS. 3 and 4 illustrate examples of the data transfer involved in different scenarios of one or more agent(s) responding to requests (either directly from the command line interface or via the controller). FIG. 5 illustrates an example of a network policy definition, while FIG. 6 illustrates a CLI request and response for the state of that network policy, and FIG. 7 illustrates an example of a CLI request and response for data about the flow entries implementing the network policy.

As shown, the process 200 begins by receiving (at 205) a request for information about flow entries associated with a particular Kubernetes concept in a cluster. The request may relate to a particular network policy (i.e., a declared Kubernetes network policy), or a specific entity in the cluster (e.g., a particular pod, node, or service). In addition, some embodiments allow more complex requests, such as a request for all flow entries relating to any network policy that are applied to a specific pod. In different embodiments, this request may be received at the CNI agent directly from the command line interface tool associated with the CNI (or a different interface with which a developer or administrator interacts) or via the centralized CNI controller (e.g., based on a request to the controller from the CLI tool).

FIG. 3 conceptually illustrates an example in which a CNI agent 300 receives and processes a request directly from the CLI tool 305 of the CNI. As shown, the agent 300 executes within a daemonset 310 on a particular node 315 on which several pods 320 also execute. Furthermore, as in FIG. 1, the OVS daemons 325 execute within the daemonset 310 and the OVS bridge 330 executes outside of the pods and provides connectivity for the pods 320. The agent 300 also stores Kubernetes cluster mapping data 335 in some embodiments. In different embodiments, this storage 335 may be a separate storage within the daemonset 310, part of the agent 300, etc. This mapping data, in some embodiments, stores data about the Kubernetes cluster that can be used for responding to flow entry requests. For instance, the mapping data 335 may include network addresses associated with specific pods, which network policies apply to which pods, which flow entries enforce which network policies, and other data used to respond to these requests. In the example shown in this figure, the CLI tool 305 receives input from a user (e.g., an application developer) that requests the flow entries realized on a particular node pertaining to a particular network policy. This request is interpreted by the CLI tool 305, which sends the request to the agent 300 at the specific node 315.

FIG. 4, on the other hand, conceptually illustrates an example in which a controller 400 sends a request to the CNI agents on multiple nodes in a cluster and aggregates the responses from these nodes. This figure illustrates three of the nodes 405-415, and for simplicity only shows the CNI agents 420-430 and the cluster mapping data 435-445 on each of these nodes 405-415. Though not shown, each of these nodes executes multiple pods as well as the OVS daemons and bridge, as in FIG. 1. In this example, the CLI tool 450 receives input from a user (e.g., an application developer) that requests the flow entries realized on any nodes in the cluster pertaining to a particular network policy. In this case, the CLI tool 450 interprets the request and forwards this request to the controller 400. The controller stores the span of the network policy (because the controller stores information about which pods to which the policy applies as well as on which nodes these pods execute). Thus, in this case, the controller 400 identifies that the particular policy applies to pods executing on at least the nodes 405 and 415 (and not on node 410) and sends requests to the agents 420 and 430 on these nodes.

Returning to the FIG. 2, the process 200 uses (at 210) the data stored regarding the locally-installed flow entries to identify flow entries realized on the node that relate to the particular Kubernetes concept specified in the request. That is, the agent identifies flow entries realized by the OVS instance executing on the node that match the request. As mentioned, the request could relate to a specific network policy, a specific pod, etc. For network policies or network policy rules, in some embodiments flow entries include a specific identifier in the one of the match or action fields. For instance, some embodiments use conjunction flow entries for certain types of network policies that simplify matches over multiple fields with many possible options for each field (these sort of flow entries are described in greater detail in U.S. Pat. No. 10,348,619, which is incorporated herein by reference). These flow entries include a conjunction identifier, which the CNI agent can use to correlate with the network policy implemented by the flow entry. Specific pods can be identified by network addresses (e.g., IP addresses) or data link addresses (e.g., MAC addresses) used as match conditions in flow entries.

Next, the process 200 selects (at 215) one of the identified flow entries that is responsive to the request. The process 200 maps (at 220) relevant match fields of the selected flow entry and/or actions specified by the selected flow entry to Kubernetes concepts in the cluster. As with the Kubernetes concepts specified in the request, the elements of the flow entry may be mapped to pods, network policies and/or network policy rules, etc. For instance, matches over table identifiers might be indicative of a specific network policy, matches over specific addresses might be indicative of specific pods, conjunction identifiers specified in actions might be indicative of a specific policy rule, etc.

The process 200 then determines (at 225) whether additional identified flow entries remain. If more flow entries remain, the process 200 returns to 215 to select another flow entry identified as responsive to the request for processing. It should be understood that the process 200 is a conceptual process, and the agent may use other methods to map all of the flow entries to Kubernetes cluster concepts. For instance, the agent of some embodiments processes some or all of the flow entries in parallel.

Once the mapping data is generated for all of the relevant flow entries, the process provides (at 230) the raw flow entry data along with the mapping data to the requestor. The process 200 then ends. As shown in FIG. 3, in the case that the CNI agent 300 receives the request directly from the CLI tool, the CNI agent 300 provides a response with the flow entries and mapping data to the CLI tool 305. The CLI tool 305 in turn provides a report with this data to the requesting user. In the case of FIG. 4, the agents 420 and 430 (as well as any other agents that received the request) provide the responsive flow entries with mapping data to the controller 400, which acts as an aggregation point. The controller 400 combines this information and provides the combined flow entries and mapping data to the CLI tool 450. Again, this CLI tool 450 provides a report with the flow entries and mapping data, in this case from multiple nodes.

As mentioned, FIG. 7 illustrates an example of such a report provided by the CLI tool of some embodiments based on data returned by a CNI agent. Before discussing this report, an example network policy will be discussed. FIG. 5 illustrates an example network policy 500 of some embodiments for web servers in a cluster. Specifically, this network policy 500 is referred to as web-app-policy and is applied to pods that match the label app=web-server. This network policy 500 is an ingress policy that, for the web-server pods, only allows http ingress traffic (TCP port 80) from pods that match the label app=web-client. That is, the web server pods are only allowed to receive http traffic from the web client pods.

The CLI tool of some embodiments enables retrieving other information about the network policies in addition to the flow entries. For a given network policy, the CLI tool can retrieve from the controller the rules for implementing that policy, the groups of addresses to which the policy relates, the pods to which the policy is applied, and the nodes on which the policy is applied. Similarly, for a specific pod, in some embodiments the CLI tool can retrieve a list of all of the network policies applied to the pod.

FIG. 6 illustrates an example of network policy state report 600 of some embodiments retrieved from the CNI controller for the network policy 500. In this case, antctl is the name of the CLI tool, and the command entered into the tool specifically requests the state of the network policy web-app-policy (in the policy namespace web-app). The report 600 provided by the controller indicates the group of pods to which the policy is applied (web-server-sp7z2 and web-server-wpgmq) and the span of the policy (nodes k8s1 and k8s2). In addition, the report 600 specifies the particular rule computed (e.g., by the controller) to enforce this policy, which specifies an allowed source IP address and allowed TCP port.

With information indicating on which nodes the policy is specified, the user can then use the CLI tool to request the flows for realizing the policy from one or more of those nodes, as in FIG. 3 (the user could also, in some embodiments, request the flow information from all nodes on which the policy is realized, as in FIG. 4). FIG. 7 illustrates such a report 700 of some embodiments showing flow entries annotated with Kubernetes cluster mapping data. In this case, the CLI request asks for flows for the network policy web-app-policy (in the policy namespace web-app) that are on the node k8s2. In response, the CNI agent on this node returns information about four flows 705-720 that are used to implement this network policy. These flows 705-720 are conjunctive flow entries which, as mentioned, are discussed in greater detail in U.S. Pat. No. 10,348,619, incorporated by reference above. It should be understood that this is a simple example, and that the realization of a typical network policy in a Kubernetes cluster would include more than one flow entry per conjunctive field.

In this example, the first flow entry 705 reads cookie=0x8501000094e9d817, table=90, priority=200, ip, nw_src=172.100.0.3 actions=conjunction (1,1/3). This raw flow entry data may be difficult for a network administrator or application developer to understand, but the report provides the generated mapping data along with the flow entry 705 (and the other flow entries) for presentation to the requestor. This mapping data indicates the table (or sub-table) of OVS to which the flow entry belongs (ingressRuleTable (NetworkPolicy ingress rules), to which table=90 maps). In addition, the mapping data specifies that this is a network policy conjunction flow that matches network policy rule conditions, and specifies the particular network policy (web-app/web-app-policy) and policy rule (rule 1). All of this information enables the user to properly contextualize the flow entry. Lastly, the mapping data indicates that the match condition ip,nw_src=172.100.0.3 means that the flow entry matches over the source IP address 172.100.0.3, which corresponds to a specific web client. Finally, the mapping data provided in the report indicates that the flow entry 705 is realized on the node.

The mapping data for flow entries 710 and 715 is similar to that for flow entry 705. The data for the second flow entry 710 indicates that the match condition ip,reg1=0x4 means that the flow entry matches on packets specifically sent to the pod web-server-sp7z2, which operates on the node k8s2. The data for the third flow entry 715 indicates that the match condition tcp, tp_dst=80 means that the flow entry matches on packets with a TCP port number of 80 (for http traffic).

Finally, the mapping data for the fourth flow entry 720 indicates that the flow entry belongs to the same table as the other three. This flow entry is different than the previous flow entries in that its match condition is a conjunction identifier conj_id=1, which is met only when the match conditions of entries for all of the conjunction dimensions have been met (i.e., the first three flow entries 705-715 have been matched). In this case, the network policy passes the data traffic because the relevant network policy rule is an allow rule. The mapping information indicates this information, as well as noting the specific network policy and rule. Furthermore, the mapping information indicates the number of packets and total bytes that have been allowed as per this flow entry. In some embodiments, the CNI agent stores data mapping these conjunction identifiers to network policy rules, so as to be able to identify the particular flow entries that implement a given network policy or policy rule.

In general, OVS supports using multiple protocols to export connection information, such as IPFIX, NetFlow, and sFlow. The CNI of some embodiments enables this export for traffic between the pods (which is governed by the CNI rules). The connection data can be exported to any number of different collectors, analyzers, and visualization consoles that support these protocols. However, standard connection exporting functionality has some limitations, in that (i) no context is added to the exported connection data to correlate flows with applications or Kubernetes abstractions, (ii) policy enforcement information is not included in the data, and (iii) the standard export mechanisms are based on packet sampling, which could generate too much flow traffic to the collector while nevertheless missing some connections.

Instead, the CNI of some embodiments provides an efficient way to export ongoing connections correlated to Kubernetes concepts and associated with network policy information, so that the consumers (e.g., a policy analytics engine, visualization solution, or direct user observation) can more easily identify the patterns of the connections within the cluster as well as the network policies and specific network policy rules that impact the different connections. Thus, some embodiments collect connection information from the data plane, append Kubernetes context to the connection information, and export the connection data (with the appended context) using, e.g., IPFIX. The context added to a connection may include source pod, source node, destination pod, destination node, destination service (if the connection is between a pod and a service in the cluster), and ingress and/or egress network policy and policy rules.

To accomplish this, in some embodiments, either the agent or another module operating on each of the container hosts along with the agent (e.g., a connection exporter module) monitors ongoing connections being processed by the forwarding element. This module retrieves data about these ongoing connections, maps the data to Kubernetes concepts implemented in the cluster, and exports the ongoing connection information along with the mapped Kubernetes concepts.

Figure 8:
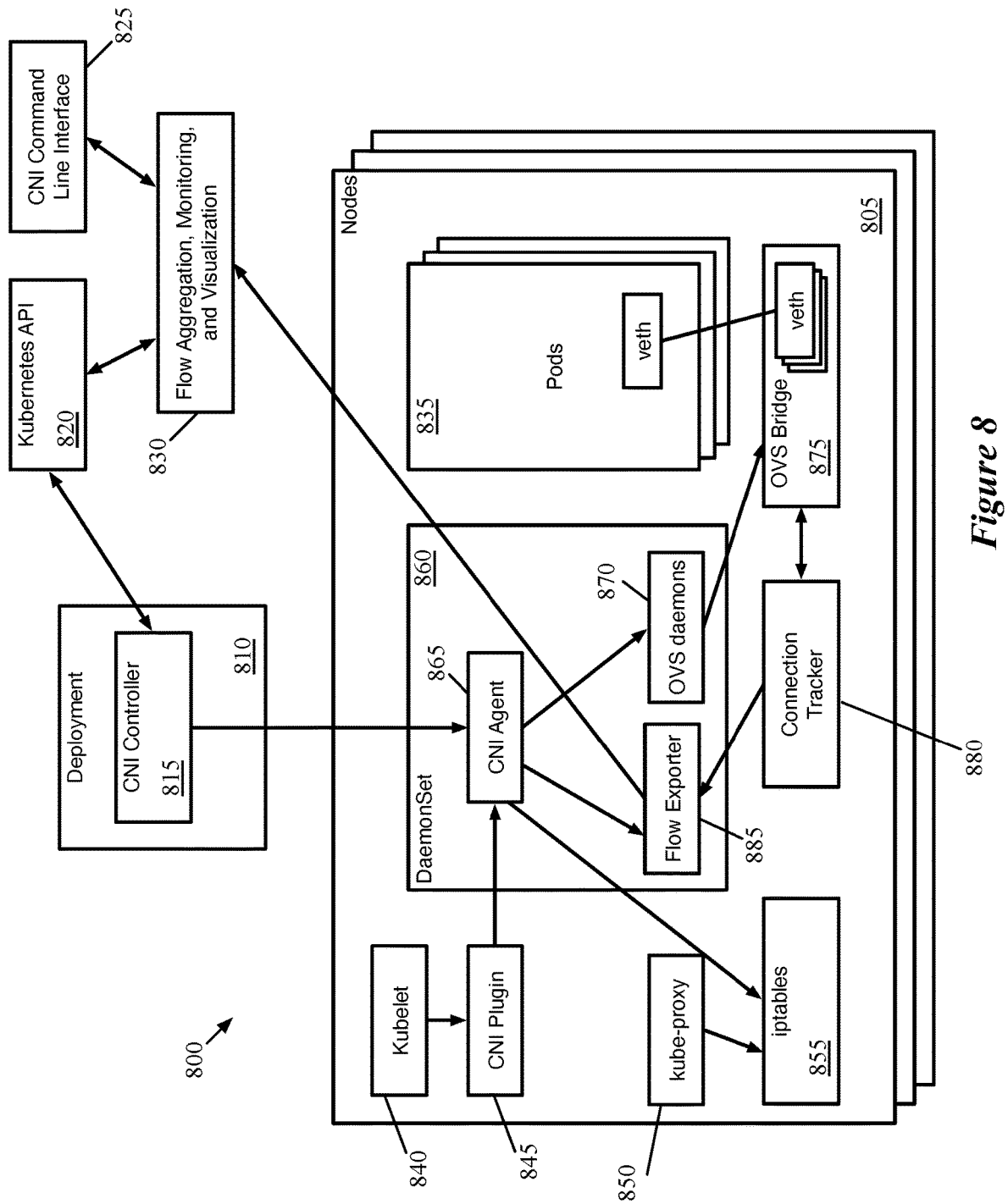
FIG. 8 conceptually illustrates a Kubernetes cluster with forwarding and networking managed by a CNI plugin of some embodiments, which has capability to monitor ongoing connections and provide information about these connections to a user.

FIG. 8 conceptually illustrates a Kubernetes cluster 800 with forwarding and networking managed by a CNI plugin of some embodiments, and which has capability to monitor ongoing connections and provide information about these connections to a user (e.g., an application developer and/or administrator). As with the cluster shown in FIG. 1, the Kubernetes cluster 800 includes numerous nodes 805, as well as a deployment 810 on which a CNI controller 815 runs, a Kubernetes API 820, and a CNI command line interface 825. For simplicity, the Octant UI is not shown in this figure. Each of the nodes, as in the example of FIG. 1, includes one or more pods 835, as well as various entities such as a kubelet 840, a CNI plugin 845, a kube-proxy 850, iptables 855, a daemonset 860 that includes a CNI agent 865 and one or more OVS daemons 870, and an OVS bridge 875.

To enable connection monitoring within the cluster, in addition to these various components each node 805 executes a connection tracker 880, and within the daemonset 860 a flow exporter module 885 also operates. Furthermore, the cluster 800 includes a set of one or more flow aggregation, monitoring, and visualization servers 830.

The connection tracker 880 is a module used by the OVS bridge 875 (and, in some cases, the OVS daemons 870 as well) to store state regarding ongoing connections. The flow entries used by OVS are otherwise stateless, but in some embodiments can specify actions that request data from the connection tracker 880. The connection tracker 880 receives data about connections from the OVS bridge 875 when they are initiated, and stores this connection information (e.g., source and destination network addresses, source and destination transport layer ports, protocol, amounts of packets, and data transferred, connection state) for ongoing connections. In some embodiments, the connection tracker 880 stores this information for both incoming and outgoing directions of a connection, as well as related connections. This allows, for example, network policies to specify that a particular pod (or group of pods) cannot initiate connections with external addresses, but can only respond to such connections (or vice versa). Further information about the operation of the connection tracker 880 of some embodiments can be found in U.S. Patent Publication 2019/0149516, which is incorporated herein by reference.

The flow exporter 885 may be part of the CNI agent 865, or a separate module (e.g., operating in a separate container in the daemonset 860) in different embodiments. The flow exporter 885 retrieves the ongoing connections from the connection tracker module (e.g., at regular intervals) and maps this data to the Kubernetes concepts. In some embodiments, the flow exporter 885 polls the connection tracker 880 at 5 or 10 second intervals. The mapping operation is similar to that described above for flow entries in some embodiments and uses the cluster data stored by the CNI agent 865. The retrieved connection data includes, in some embodiments, source and destination network addresses and transport layer ports. In addition, the connection data also includes information about the status of the ongoing connection (e.g., the number of packets sent in either direction, the amount of data sent, any related connections, etc.).

The flow exporter 885 uses information from the CNI agent 865 to map connection data to the available Kubernetes cluster data, in some embodiments (as further described below, some Kubernetes cluster data may not be available to the CNI agent on a node, and is added at a centralized aggregator). As described above, the CNI agent 865 stores data that maps, e.g., IP addresses to specific pods in the cluster. This data can also include mapping of pods to specific nodes (so that the flow exporter 885 can export the connection information along with source and destination nodes in addition to source and destination pods).

Furthermore, the flow exporter also identifies network policies that are applied to each connection in some embodiments. As described above, the network policies are implemented using conjunctive match flow entries in some embodiments, and therefore policy rules can be identified by the conjunction identifiers. In some embodiments, the OVS bridge 875 is configured to provide to the connection tracker 880 the conjunction identifiers for flows that are applied to each connection. In other embodiments, other types of unique identifiers (e.g., UUIDs) are embedded in the OVS flow entries that implement network policy rules, and these unique identifiers are provided to the connection tracker 880.

The flow exporter 885 exports this connection information with mapping data to the flow aggregation, monitoring, and visualization components 830. In some embodiments, the connection information is exported in IPFIX format, with the Kubernetes concepts included as metadata (e.g., as IPFIX Information Elements). In some embodiments, rather than exporting the same connection numerous times, the flow exporter 885 tracks the connection lifecycle based on the regular updates from the connection tracker, and only sends updates to the components 830 when a flow is created or deleted (in order to reduce traffic).

The flow aggregation, monitoring, and visualization components 830 may execute within the Kubernetes cluster 800 (e.g., as a distributed service) or outside of the cluster, and may operate as a single component or as multiple separate components. For instance, some embodiments include an aggregator within the cluster that aggregates connection data (e.g., IPFIX data) from multiple nodes, then forwards this aggregated data to one or more collectors and/or visualizers outside of the cluster that are accessed by users (e.g., application developers and/or administrators).

In addition, some embodiments add Kubernetes mapping data if that data is not available at the CNI agent 865. In some cases, it may not be efficient for every agent in a cluster to store information about every Kubernetes concept in the cluster. For example, in some embodiments, the CNI agent 865 only has the pod names for each IP address, but does not store information mapping every pod in the cluster to the node on which that pod executes. Similarly, the CNI agent 865 might only store information for its local pods and not for all of the remote pods, and might not store information about distributed services in the cluster. In some such embodiments, the aggregator 830 adds its own Kubernetes concepts mapping data (e.g., source and destination node names, distributed services data) in addition to the mapping data received from the flow exporters 885.

The additional monitoring and/or visualization components 830 may be part of a larger network management and control system, in some embodiments. For instance, in some embodiments, a flow aggregation component 830 in the cluster 800 provides the aggregated data to a network management and control system visualization (e.g., NSX Intelligence). Such a management and control system can push global policies (e.g., via the CLI tool 825 or another adaptor executing in the cluster) as well as monitor network and policy realization status. These global policies are enforced by the CNI either by conversion to Kubernetes network policies or as separate flow entries, in different embodiments. This allows the network management and control system to manage multiple federated Kubernetes clusters in some embodiments, each running the same CNI plugins. The management and control system collects cluster health and statistics, as well as log bundles of the CNI components from any connected cluster in some embodiments.

The network analysis and visualization tools of such a management and control system can also be extended to consume the connection data exported by the flow exporter 885 and flow aggregation component in the cluster. Such a tool can visualize all of the connections and applied network policies within the cluster. In addition, advanced connection monitoring, policy analytics, and recommendation features of such a tool may be enabled for a Kubernetes cluster.

Figure 9:
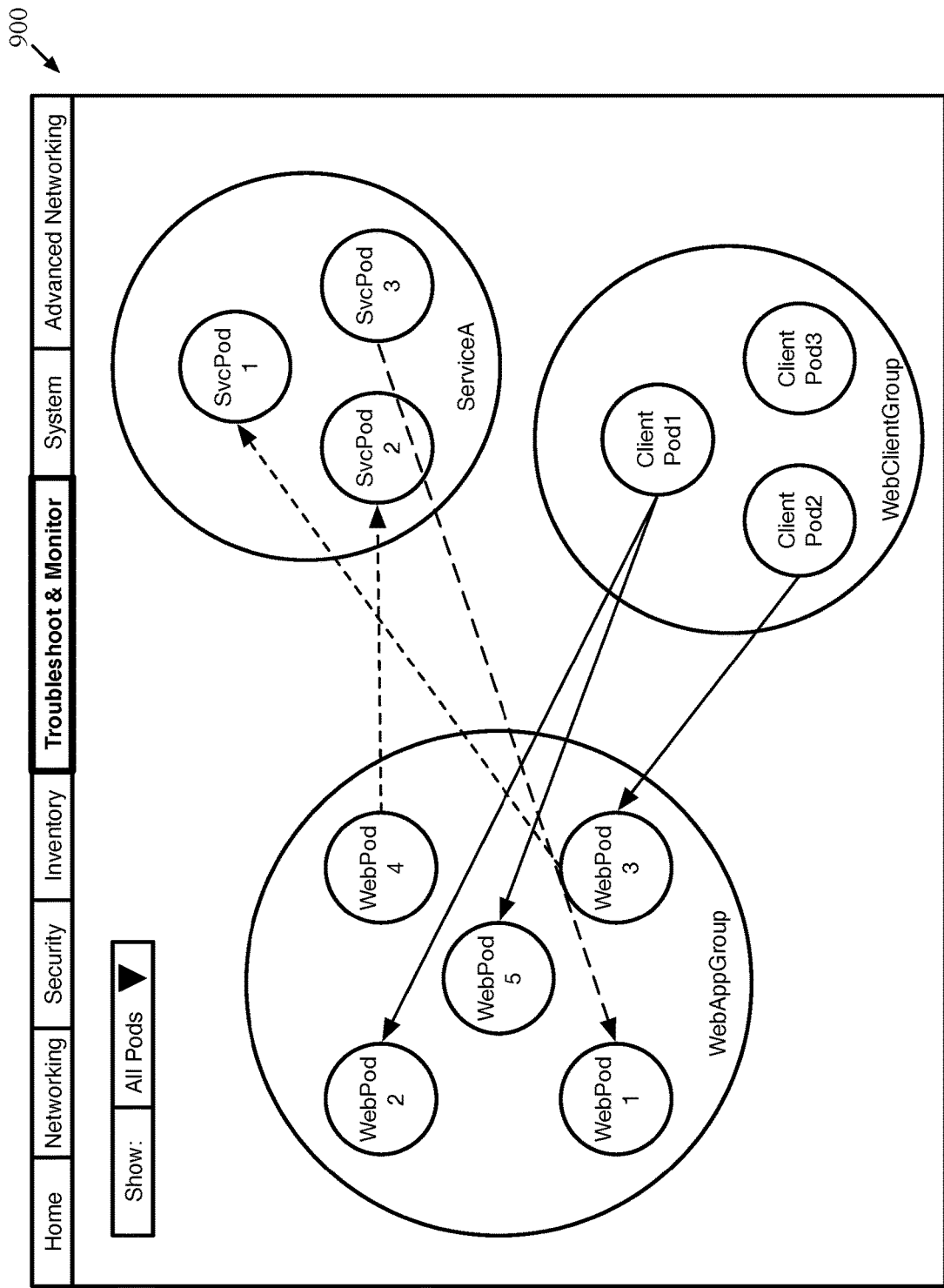
FIG. 9 illustrates an example of a visualization tool graphical user interface (GUI) showing connections between pods in a cluster.

FIG. 9 illustrates an example of such a visualization tool graphical user interface (GUI) 900 showing connections between pods in a cluster. The visualization tool GUI 900 is part of a larger network management application, and in this case is part of the troubleshooting and monitoring features of the application. As shown, the GUI 900 illustrates the various pods of the cluster in their different groups (in this case, a web app group, a web client group, and a service A group). The visualization tool, in some embodiments, may group the pods based on various different factors (e.g., the deployment to which the pods belong).

The GUI 900 also shows ongoing (or recent) connections between the pods, as determined by the flow exporter and aggregator features within the cluster. Some embodiments, as is the case here, visualize different connections differently (e.g., different types of lines, different colors, etc.), and use arrows to show the initiation direction of the connections. In some embodiments, the GUI 900 may also be customizable to show the nodes on which each pod executes (or group the pods by node), pod IP addresses, or other information about the pods. The GUI 900 may also include options to filter out certain pods (i.e., to only show certain groups, to remove services, etc.) or connections, in some embodiments, as well as to display information about the policies in place.

Figure 10:
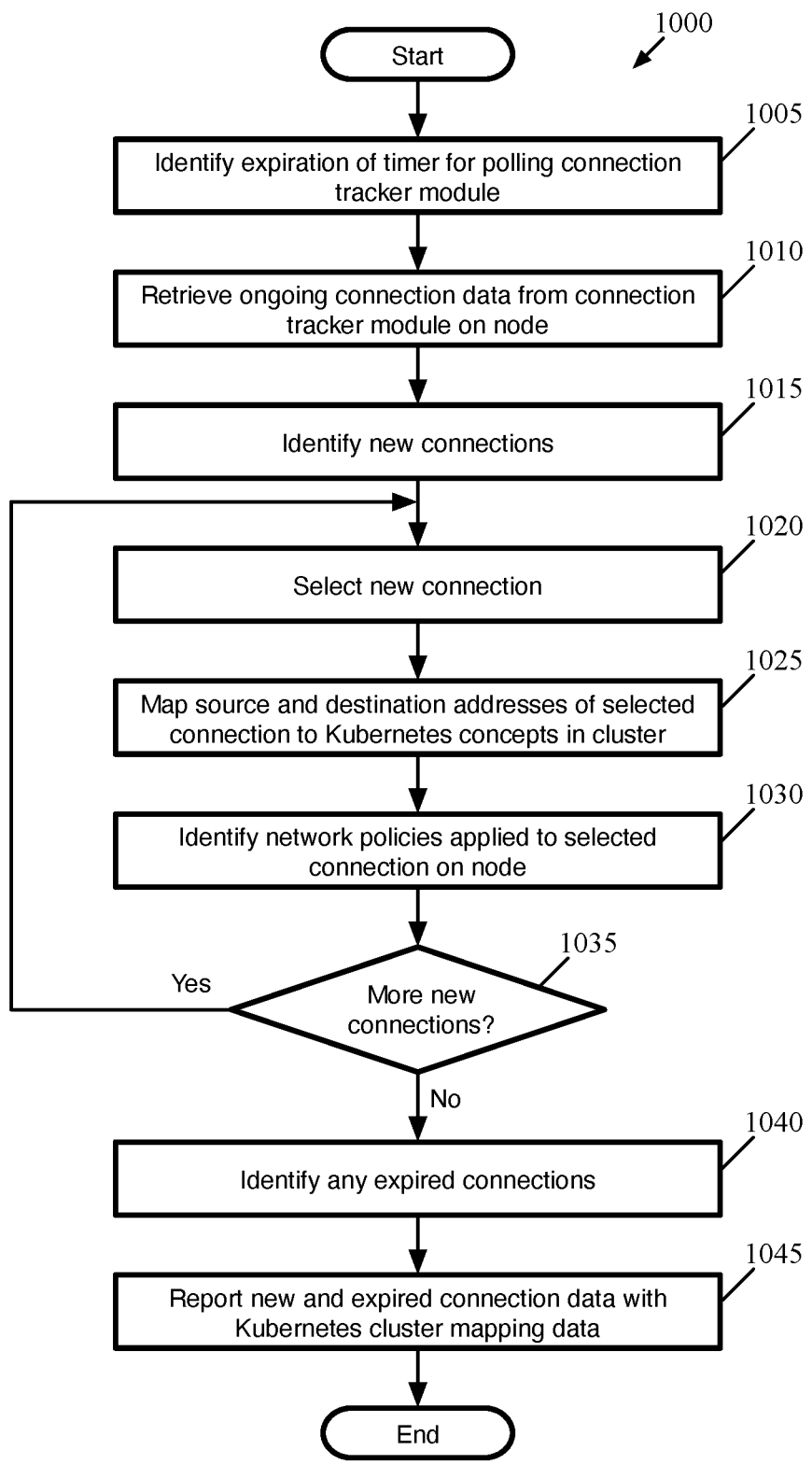
FIG. 10 conceptually illustrates a process of some embodiments for reporting connection data from a node in a cluster such as that shown in FIG. 8.
Figure 11:
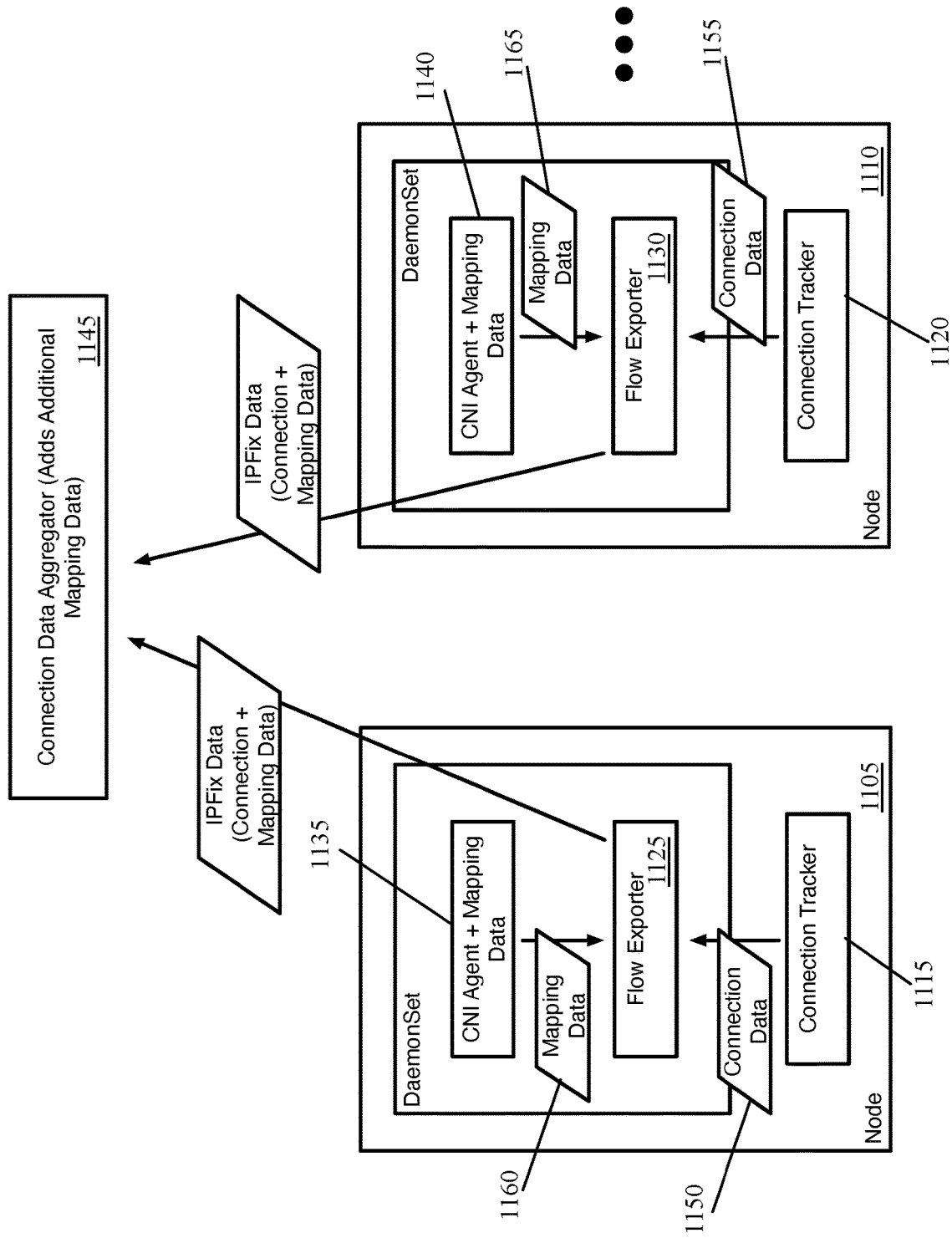
FIG. 11 conceptually illustrates an example of the data transfer involved in the connection export process.
Figures 12, 13:
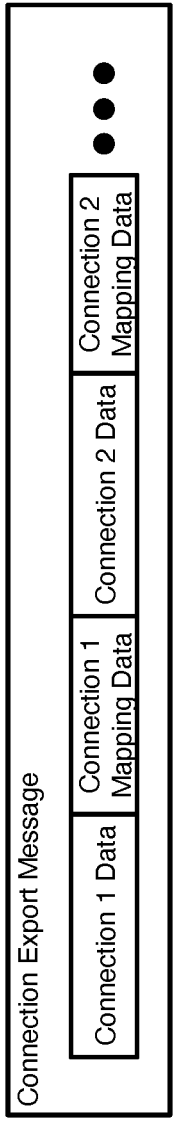
FIG. 12 conceptually illustrates an example of raw connection data provided by a connection tracker module to a connection exporter of some embodiments.
FIG. 13 conceptually illustrates a connection and mapping data export message of some embodiments from a connection exporter on a node to a connection aggregator.

FIG. 10 conceptually illustrates a process 1000 of some embodiments for reporting connection data from a node in a cluster such as that shown in FIG. 8. The process 1000 is performed, in some embodiments, by a connection exporter operating on a node (e.g., the flow exporter module 885 executing within a daemonset pod on a node), or a CNI agent if the connection export functionality is built into the agent. The process 1000 will be described at least in part by reference to FIGS. 11-13. FIG. 11 illustrates an example of the data transfer involved in the flow export process, FIG. 12 illustrates an example of connection data received from a connection tracker, and FIG. 13 illustrates an example of a connection export message sent from the export module on a node to an aggregator.

As shown, the process 1000 begins by identifying (at 1005) the expiration of a timer for polling a connection tracker module. In some embodiments, the connection exporter module uses a timer in order to ensure that the connection tracker is polled at regular intervals (e.g., every 5 seconds, every 10 seconds, every minute, etc.). It should also be understood that some embodiments may retrieve connection data form the connection tracker for other reasons (e.g., an external request for the data), either as an alternative to or in addition to regular polling.

In response to identifying the expiration of the timer (or based on another event), the process 1000 retrieves (at 1010) ongoing connection data from the connection tracker module on its node. This connection data typically includes at least source and destination network addresses and transport layer ports and may also include information about the status of the ongoing connection (e.g., the number of packets sent in either direction, the amount of data sent, any related connections, etc.).

As mentioned, FIG. 11 conceptually illustrates an example of the data transfer involved in the connection export process. This figure includes two nodes 1105 and 1110, for simplicity only showing the connection trackers 1115 and 1120, flow exporters 1125 and 1130, and CNI agents (with mapping data) 1135 and 1140. Both of the flow exporters 1125 and 1130 (as well as those on additional nodes) provide data to a connection data aggregator 1145. As shown in this figure, the flow exporter 1125 on the first node 1105 retrieves raw connection data 1150 from the connection tracker 1115 on its node 1105, while the flow exporter 1130 on the second node 1110 retrieves raw connection data 1155 from the connection tracker 1120 on its node 1110.

FIG. 12 conceptually illustrates an example of raw connection data 1200 provided by a connection tracker module to a connection exporter of some embodiments. Specifically, the data 1200 includes data for two connections 1205 and 1210. The data for the first connection 1205 indicates that the connection is a TCP connection, first listing the origination connection data (i.e., the data for the direction in which the connection was initiated) and then the reply connection data. For each direction, the connection data 1205 includes source and destination IP addresses and TCP ports (which are reversed between the two directions) as well as the amount of packets and total data processed in that direction by the local OVS bridge. In addition, the connection data 1205 indicates the current state of the connection as established. This state can be used by the flow exporter modules (e.g., to identify new connections or changes in connection state) as well as the OVS bridge on the node. The data for the second connection 1210 provides similar data, except that the state of this connection 1210 is shown as "TIME WAIT" which indicates that the connection is in the process of being torn down (but additional packets may still need to be processed for the connection).

Returning to FIG. 10, the process 1000 next identifies (at 1015) any new connections. Some embodiments automatically generate cluster mapping data for all of the connections retrieved from the connection tracker and report all of these connections to the aggregator at each time interval, but this can waste processing resources and network bandwidth. Instead, some embodiments only report new connections or deleted (ended) connections. The connection exporter of some embodiments stores data for all of the connections for which mapping data has previously been generated and exported and compares the recently retrieved connection data to this stored data in order to identify any connections that are new.

The process 1000 then selects (at 1020) one of the identified new connections, and maps (at 1025) the source and destination addresses of the selected connection to Kubernetes concepts in the cluster (as available to the flow exporter). In some embodiments, the flow exporter maps the source and destination addresses to pods executing on its node or on other nodes, and possibly also to the nodes on which the identified pods execute.

The process 1000 also identifies (at 1030) network policies that are applied to the selected connection on the node. As described above, the connection tracker stores identifiers for the network policy rules applied to packets belonging to the connection in some embodiments. These may be conjunction identifiers (for conjunctive match flow entries), UUIDs associated with the rule, etc. The CNI agent on the node stores the mappings of these identifiers to the network policy rules, and so can identify the policy rules (and thus the network policies) applied to packets of each connection. As noted above, in some embodiments, the flow exporter only maps a portion of the Kubernetes cluster information to the connections (i.e., the portion for which the CNI agent on the node includes the mapping data). In such embodiments, the aggregator to which the connection and mapping data is reported also adds additional Kubernetes cluster mapping data to the connection information.

In some embodiments, the flow exporter queries the CNI agent for the cluster mapping data. For instance, the flow exporter of some embodiments sends the source and destination IP addresses of each new connection to the CNI agent, which returns the names of the pods associated with those addresses (and, if storing the information, the names of the nodes on which those pods execute). For network policies, the flow exporter sends the identifier(s) associated with the connection, and the CNI agent returns the policy rules (and their associated network policies) that correspond to those identifiers. FIG. 11 illustrates the CNI agents 1135 and 1140 providing mapping data 1160 and 1165 to their respective flow exporters 1125 and 1130. These flow exporters 1125 and 1130 use this data to generate the cluster mapping data for export with the connection information.

Returning to FIG. 10, the process 1000 next determines (at 1035) whether any additional new connections remain and, if so, returns to 1020 to select the next such connection. It should be understood that the process 1000 is a conceptual process, and the flow exporter may use other methods to map data for new connections to Kubernetes cluster concepts. For instance, in some embodiments the flow exporter sends a single query to the CNI agent for all of the data on all of the new connections, rather than processing each connection separately. In addition, in some cases there may not be any new connections since the last retrieval of connection data, in which case the process skips 1020-1030.

Once the mapping data has been generated for any new connections, the process 1000 identifies (at 1040) any expired (i.e., torn down) connections. The connection exporter may identify these expired connections based on the connection state provided by the connection tracker (e.g., in FIG. 12, the second connection data 1210 indicates that this connection is in the process of being torn down). In addition, when the connection exporter stores an ongoing list of all of the active connections, it can identify any connections that are no longer in the data retrieved from the connection tracker.

Finally, the process reports (at 1045) the new and expired connection data along with the Kubernetes cluster mapping data. As described above, in some embodiments the connection exporter exports this data to an aggregation service operating in the same cluster (e.g., as a service). This aggregation service compares and combines data for the same ongoing connections from source and destination nodes and may add additional Kubernetes information to the data (e.g., node information).

FIG. 11 shows that both of the flow exporters 1125 and 1130 transmit IPFIX data with both the connection and mapping data to the connection data aggregator 1145. In some embodiments, the connection data is exported in standard IPFIX format, with the mapping data appended as IPFIX information elements. Other embodiments may use other formats, such as sFlow or NetFlow. FIG. 13 conceptually illustrates a connection and mapping data export message 1300 of some embodiments from a connection exporter on a node to a connection aggregator. The export message 1300, as shown, includes information for each of multiple connections, with the mapping data appended to each set of connection data. In this example, the connection and mapping data is sent as a single message; depending on the amount of data to be transmitted, one or more messages may be sent for each export.

The connection aggregator 1145, as described above, may also (i) supplement the mapping data received from the flow exporters 1125 and 1130 and (ii) provide the connection and mapping data to additional monitoring and/or visualization components in the cluster or outside of the cluster (e.g., components of a network management and control system). These components may visualize all of the connections and applied network policies within the cluster. In addition, advanced connection monitoring, policy analytics, and recommendation features of such a tool may be enabled for a Kubernetes cluster.

In some embodiments, the agents on the nodes in a cluster also enable flow tracing and relate flow entries matched in a flow tracing operation to Kubernetes concepts. Flow tracing operations allow one or more forwarding elements in the cluster to simulate the processing of a data message with pre-specified characteristics in order for an administrator or application developer to determine which flow entries act upon the data message (either using a simulation mechanism provided by the forwarding element or by injecting a flow tracing data message having the specified characteristics). These flow tracing operations and mapping of matched flow entries to Kubernetes concepts are described in more detail in concurrently-filed U.S. patent application Ser. No. 17/006,845, filed Aug. 30, 2020, which is incorporated herein by reference.

Figure 14:
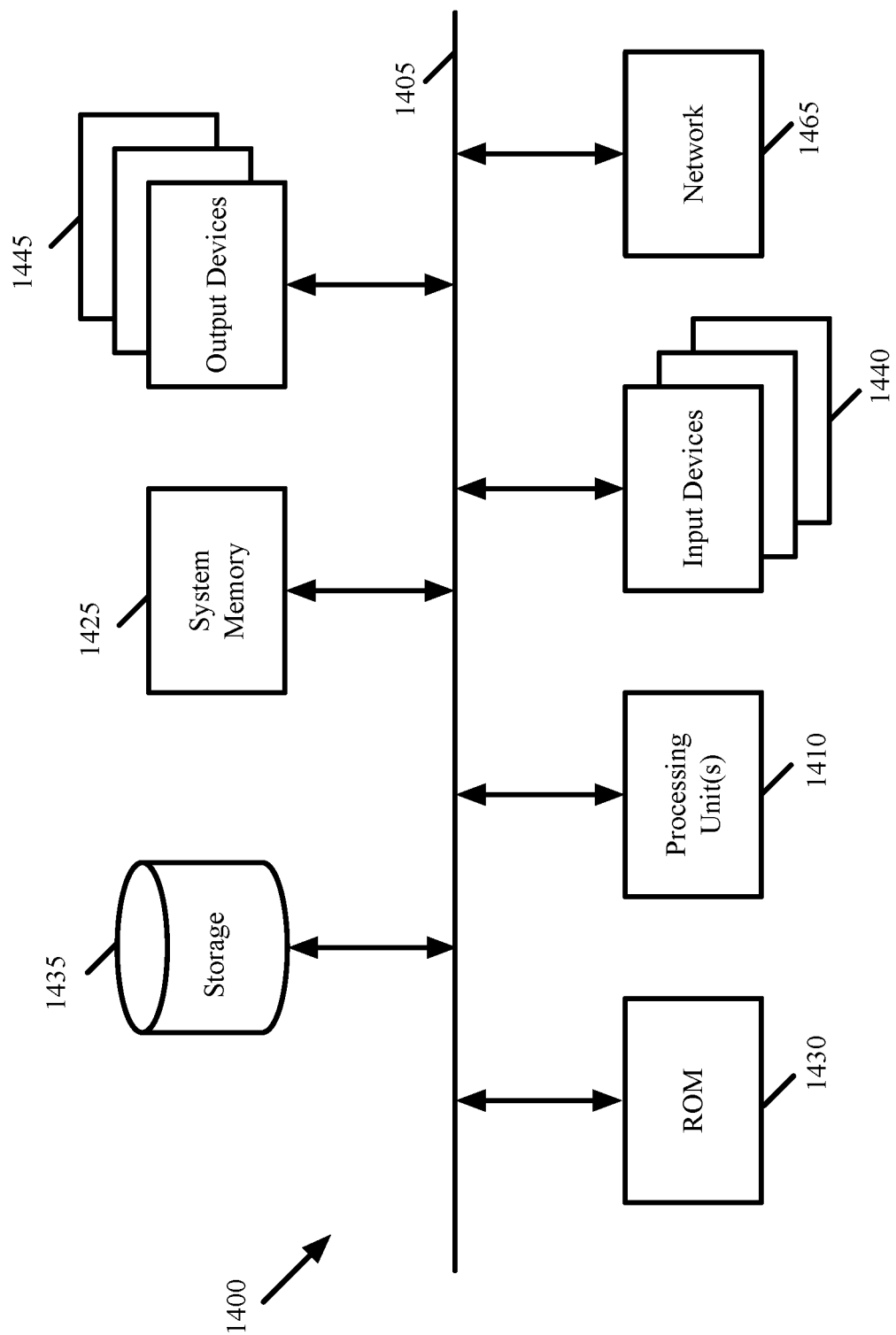
FIG. 14 conceptually illustrates an electronic system with which some embodiments of the invention are implemented.

FIG. 14 conceptually illustrates an electronic system 1400 with which some embodiments of the invention are implemented. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random-access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2 and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method performed by an agent executing on a particular node of a cluster, the method comprising:
receiving a request for flow entries associated with a particular Kubernetes concept;
identifying flow entries that match the request, the identified flow entries comprising flow entries used by a forwarding element also executing on the particular node along with a plurality of pods connected to the forwarding element, the forwarding element implementing networking and network policy defined for the pods;
for each flow entry that matches the request, generating mapping data that maps elements of the flow entry to additional Kubernetes concepts; and
providing the flow entries with the mapping data in response to the request.

2. The method of claim 1, wherein the particular node is one of (i) a virtual machine (VM) and (ii) a physical server computer.

3. The method of claim 1, wherein the agent configures the forwarding element according to configuration data received from a central controller that also provides configuration data to a plurality of other agents executing on other nodes of the cluster.

4. The method of claim 3, wherein:
the agent receives the request from the central controller; and
the flow entries and mapping data are provided to the central controller.

5. The method of claim 4, wherein the central controller receives flow entries and mapping data related to the particular Kubernetes concept from a plurality of agents executing on a plurality of nodes of the cluster.

6. The method of claim 1, wherein the agent receives the request from and provides the flow entries and mapping data to a command line interface utility through which an administrator specifies the request.

7. The method of claim 1, wherein each respective flow entry comprises (i) a respective set of match conditions and (ii) a respective set of actions to be performed when a data message matches the respective set of match conditions.

8. The method of claim 7, wherein generating mapping data for a particular flow entry comprises mapping at least one of the match conditions for the particular flow to the particular Kubernetes concept.

9. The method of claim 7, wherein generating mapping data for a particular flow entry comprises mapping at least one of the match conditions for the particular flow to a particular pod and specifying a name for the particular pod.

10. The method of claim 7, wherein:
the flow entries are organized into a plurality of tables;
the particular Kubernetes concept is a particular network policy;
identifying flow entries that match the request comprises identifying flow entries in a particular table that corresponds to the particular network policy; and
generating mapping data for a particular flow entry comprises specifying a particular rule of the particular network policy to which the particular flow entry corresponds.

11. The method of claim 7, wherein:
the flow entries are organized into a plurality of tables;
the received request is for all flow entries associated with any network policy applied to a particular pod;
identifying flow entries that match the request comprises identifying flow entries that are (i) in a particular set of tables that correspond to network policies and (ii) are applied to data messages sent to and from the particular pod; and
generating mapping data for a particular flow entry comprises specifying a particular rule of a particular network policy to which the particular flow entry corresponds.

12. The method of claim 1, wherein:
the particular Kubernetes concept is a particular pod; and
identifying flow entries that match the request comprises identifying flow entries that are applied to data messages sent to and from the particular pod.

13. A non-transitory machine-readable medium storing an agent for execution by at least one processing unit associated with a particular node of a cluster, the agent comprising sets of instructions for:
receiving a request for flow entries associated with a particular Kubernetes concept;
identifying flow entries that match the request, the identified flow entries comprising flow entries used by a forwarding element also executing on the particular node along with a plurality of pods connected to the forwarding element, the forwarding element implementing networking and network policy defined for the pods;
for each flow entry that matches the request, generating mapping data that maps elements of the flow entry to additional Kubernetes concepts; and
providing the flow entries with the mapping data in response to the request.

14. The non-transitory machine-readable medium of claim 13, wherein:
the agent further comprises a set of instructions for configuring the forwarding element according to configuration data received from a central controller that also provides configuration data to a plurality of other agents executing on other nodes of the cluster;
the agent receives the request from the central controller and provides the flow entries and mapping data to the central controller; and
the central controller receives flow entries and mapping data related to the particular Kubernetes concept from a plurality of agents executing on a plurality of nodes of the cluster.

15. The non-transitory machine-readable medium of claim 13, wherein each respective flow entry comprises (i) a respective set of match conditions and (ii) a respective set of actions to be performed when a data message matches the respective set of match conditions.

16. The non-transitory machine-readable medium of claim 15, wherein the set of instructions for generating mapping data for a particular flow entry comprises a set of instructions for mapping at least one of the match conditions for the particular flow to a particular pod and specifying a name for the particular pod.

17. The non-transitory machine-readable medium of claim 15, wherein:
the flow entries are organized into a plurality of tables;
the particular Kubernetes concept is a particular network policy;
the set of instructions for identifying flow entries that match the request comprises a set of instructions for identifying flow entries in a particular table that corresponds to the particular network policy; and
the set of instructions for generating mapping data for a particular flow entry comprises a set of instructions for specifying a particular rule of the particular network policy to which the particular flow entry corresponds.

18. The non-transitory machine-readable medium of claim 15, wherein:
the flow entries are organized into a plurality of tables;
the received request is for all flow entries associated with any network policy applied to a particular pod;
the set of instructions for identifying flow entries that match the request comprises a set of instructions for identifying flow entries that are (i) in a particular set of tables that correspond to network policies and (ii) are applied to data messages sent to and from the particular pod; and
the set of instructions for generating mapping data for a particular flow entry comprises a set of instructions for specifying a particular rule of a particular network policy to which the particular flow entry corresponds.

* * * * *